Oct. 15, 1957    W. T. NELSON    2,809,925
AZEOTROPIC DISTILLATION
Filed Dec. 20, 1954
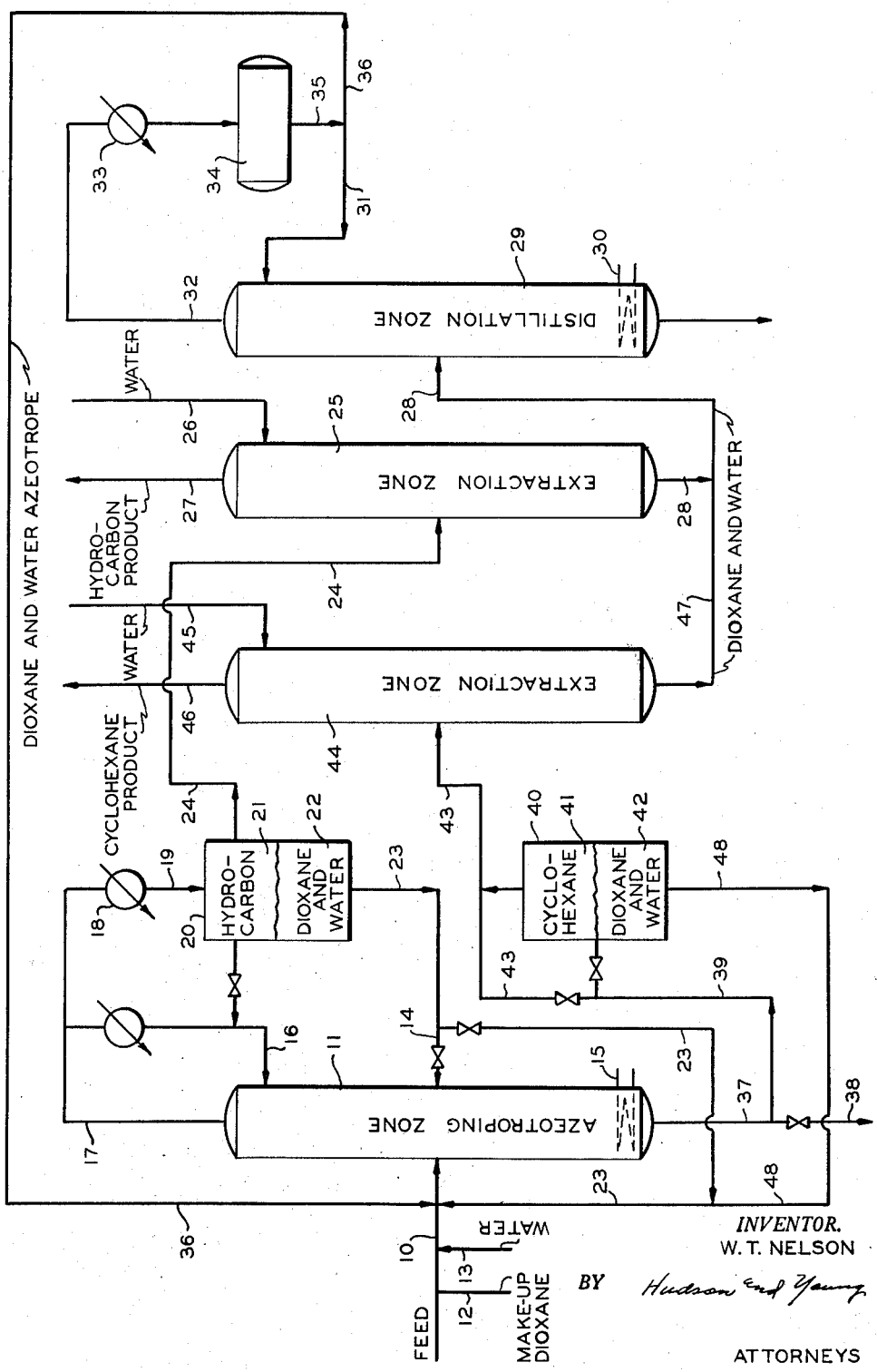
INVENTOR.
W. T. NELSON
BY Hudson and Young
ATTORNEYS

United States Patent Office 2,809,925
Patented Oct. 15, 1957

2,809,925

AZEOTROPIC DISTILLATION

William T. Nelson, Bartlesville, Okla., assignor to Phillips Petroleum Company, a corporation of Delaware Application December 20, 1954, Serial No. 476,157

14 Claims. (Cl. 202—42)

This invention relates to the separation of hydrocarbons by distillation. In one aspect this invention relates to the separation of difficultly separable hydrocarbons by azeotropic distillation. In one of its more specific aspects this invention relates to using water and a saturated oxygen containing heterocyclic organic compound having from two to three oxygen atoms and from three to four carbon atoms in the ring, as a vapor entrainer in the separation by distillation of naphthenic hydrocarbons from a mixture of hydrocarbons comprised substantially of naphthenic, paraffinic and isoparaffinic hydrocarbons.

The separation of volatile compounds by azeotropic distillation is well know and is practiced to effect separations which are difficult or even impossible by ordinary distillation methods. Mixtures of volatile compounds in many instances have such volatility characteristics that ordinary distillation yields only one component of acceptable purity, and in some instances substantially no separation at all is effected. This difficulty in effecting separation by fractional distillation may be due to the formation of constant boiling mixtures or azeotropes, or it may be that the boiling points of the components are so close together that columns of a practical number of plates are ineffective. In order to separate such mixtures, solvent extraction or azeotropic distillation processes can be used. In the process of azeotropic distillation, an additional volatile component is added which so alters the volatilities of the original constituents that satisfactory separation in a fractionating column of a practical number of plates becomes possible. In order for azeotropic distillation to be useful, separation and recovery of the entrainer from the products must be possible. Most azeotropes, as is well known, are of the low boiling or minimum boiling point type, although some high boiling or maximum boiling point azeotropes are known. In azeotropic distillation, the entrainer is added to the system and it preferentially azeotropes with one or more of the components during the distillation. The azeotrope of the entrainer with one or more components of the mixture has a greater volatility than the remaining component or components and/or azeotropes thereof. Upon separation of the entrainer from the azeotropic mixture by any of various known means, the separation of the original mixture has been effected. In case any entrainer remains in solution in the still bottoms, it may be separated therefrom to complete the separation and recovery process. Frequently, however, the amount of entrainer employed is adjusted so that substantially all is taken overhead and the kettle product is substantially entrainer-free.

Cyclohexane is a valuable naphthene for blending aviation fuels and it occurs naturally in relatively small amounts in such complex hydrocarbon mixtures as natural and straight run gasolines. 2,2-dimethylpentane and 2,4-dimethylpentane are also present in such gasolines. Such mixtures require very efficient fractionation to accomplish even a partial separation, but final products of high purity cannot be obtained by fractionation alone.

It is known that some heterocyclic organic compounds, such as para-dioxane can be used to separate naphthene hydrocarbons from paraffinic hydrocarbons by azeotropic distillation.

I have now found that water, together with a five or six membered saturated heterocyclic organic oxygen containing compound, such as para-dioxane, is an effective vapor entrainer when used in the azeotropic distillation of a mixture of hydrocarbons comprised substantially of naphthenic, paraffinic and isoparaffinic hydrocarbons. I have found that the said vapor entrainer is particularly effective for the separation of high purity cyclohexane from hydrocarbon mixtures containing the isoparaffins, 2,2- and 2,4-dimethylpentane. When using the said entrainer increased yields of high purity cyclohexane are obtained as a product of the distillation.

Thus, broadly speaking, my invention comprises using water and a saturated, oxygen containing, heterocyclic organic compound, such as 1,4-dioxane (para-dioxane) as a vapor entrainer in an azeotropic distillation process for the separation of naphthenic hydrocarbons from a mixture of hydrocarbons comprised substantially of naphthenic hydrocarbons, paraffinic hydrocarbons and isoparaffinic hydrocarbons.

An object of my invention is to provide an improved method of separating close boiling hydrocarbons.

Another object of my invention is to provide a process for separating naphthenic hydrocarbons from mixtures of hydrocarbons containing paraffinic and isoparaffinic hydrocarbons by distillation methods.

Another object of my invention is to provide a process for separating cyclohexane from a mixture comprised substantially of cyclohexane, isoparaffin and paraffin hydrocarbons, by distillation methods.

Another object of my invention is to provide an azeotropic distillation process for the separation of cyclohexane from a mixture of hydrocarbons comprised substantially of cyclohexane, 2,2- and 2,4-dimethylpentane, other isoparaffins and paraffinic hydrocarbons.

Still other objects and advantages of my invention will be apparent from that which follows.

Thus, according to the invention there is provided a process for the separation of naphthenic hydrocarbons from a mixture of hydrocarbons comprised substantially of naphthenic, paraffinic and isoparaffinic hydrocarbons, which comprises: subjecting said mixture to distillation conditions in the presence of water and a saturated oxygen containing heterocyclic organic compound having from five to six members in the ring, three to four of said members being carbon atoms and two to three of said members being oxygen atoms; and recovering naphthenic hydrocarbons from said distillation.

It is to be noted that water is used with the heterocyclic organic compound in the distillation process of the invention. It is presently believed that said water and said heterocyclic organic compound form complex azeotropes with the naphthenic and/or other hydrocarbons present in the mixture. Thus the vapor entrainer of the invention is comprised of water and the said heterocyclic organic compound.

Suitable but not necessarily equivalent heterocyclic organic compounds which can be employed in accordance with the invention are 1,4-dioxane (paradioxane), 1,3-dioxane, dioxolane and trioxane. A presently preferred compound, particularly for use in separating cyclohexane from mixtures of hydrocarbons containing 2,2- and 2,4-dimethylpentane is 1,4-dioxane (para-dioxane).

The drawing illustrates diagrammatically one form of apparatus which can be employed to carry out the several embodiments of the invention.

Referring now to the drawing the invention will be more fully explained. A charge stock comprised substantially of cyclohexane, 2,2-dimethylpentane and 2,4-dimethylpentane is introduced through line 10 into azeotroping zone 11. A quantity of 1,4-dioxane and water is introduced through lines 12 and 13 into line 10 for use as a vapor entrainer in said azeotroping column 11. The dioxane and water may alternately be introduced into said column through line 14. As will be subsequently described the main portion of the entrainer material is introduced through said line 14 as recycle material. Sufficient reboiling heat from a source, not shown, is introduced into the kettle section of column 11 by means of reboiler coil 15 and sufficient cooling is added as liquid reflux through line 16 for properly cooling the top of the tower, to provide effective distillation conditions. A hydrocarbon stream depleted in cyclohexane is removed from the top of column 11 through vapor line 17. That portion of the vaporous material in line 17 not required for refluxing is condensed in condenser 18 and the condensate passed through line 19 into phase separator vessel 20. In vessel 20 two liquid phases accumulate. The upper phase 21 comprises hydrocarbons depleted in cyclohexane containing some dioxane and water dissolved therein. The lower liquid phase 22 comprises a solution of dioxane and water having some hydrocarbon dissolved therein. Since the solubility of the hydrocarbons in the dioxane-water solution is relatively low, the liquid phase 22 is suitable for removal through lines 23 and 14 for passage therethrough into azeotropic column 11 as the aforementioned main quantity of vapor entrainer. If desired the dioxane and water solution 22 can be passed through line 23 into line 10 and introduced with the feed into column 11. Makeup dioxane and water as required can be added to the system through the lines 12 and 13 respectively as previously described.

The upper liquid layer 21 in phase separator 20 is withdrawn through line 24 and passed into extraction column 25 wherein it is contacted countercurrently with a stream of water introduced into the top of extraction column 25 through line 26. Said water preferentially extracts the dissolved dioxane from the hydrocarbons contained in the feed to column 25 and said hydrocarbons, substantially dioxane free, are withdrawn through line 27 as a product of the process. Water containing extracted dioxane is withdrawn from extraction column 25 through line 28 and passed into distillation column 29. Sufficient heat from a source, not shown, is introduced into the kettle section of column 29 by means of reboiler coil 30 and sufficient cooling is added as liquid reflux through line 31 to properly cool the top of said tower and thereby provide effective distillation conditions. 1,4-dioxane and water form an azeotrope boiling at 190° F. and containing 18% dioxane. Said azeotrope of dioxane and water in vapor form is withdrawn from column 29 through line 32, condensed in condenser 33, and passed to accumulator 34. Condensate is withdrawn from accumulator 34 through line 35, a portion being passed through line 31 as reflux as previously described, and the remainder is returned through line 36 to line 10 and introduced into azeotroping column 11 as a portion of the vapor entrainer used therein.

The bottoms product resulting from the distillation operation carried out in column 11 is removed from said column 11 through line 37 and may be passed on through line 38 to storage or subsequent use not shown, as the main product of the process. Said main product comprises cyclohexane. In case the proportion of vapor entrainer (dioxane and water) used in column 11 is just sufficient to azeotrope with all of the hydrocarbons except the cyclohexane of the feed stock or if a slight deficiency of said entrainer is used there will not be any of said entrainer in the bottoms product withdrawn through lines 37 and 38 and under this condition the cyclohexane is of sufficient purity to be a finished product of the process.

However, if an excess of the entrainer is introduced into column 11 the excess will be contained in the cyclohexane bottoms product and it is necessary to further purify said cyclohexane. In this latter instance the cyclohexane is passed from line 37 into line 39 and can be introduced into phase separator 40 wherein two liquid phases accumulate as described in connection with separator vessel 20. The upper phase 41 comprises cyclohexane having a small proportion of dioxane and water dissolved therein. The lower phase 42 comprises a solution of dioxane and water having a small proportion of cyclohexane dissolved therein. Said upper phase 41 is withdrawn through line 43 and passed through extraction column 44 wherein it is contacted, in the manner described above in connection with extraction column 25, countercurrently with a stream of water introduced through line 45. Purified cyclohexane substantially dioxane-free is withdrawn through line 46 as a main product of the process. Dioxane and water are withdrawn from column 44 through line 47 and passed into line 28 where it joins the said dioxane and water from extraction column 25 and the mixture is distilled in distillation column 29 as previously described. Lower liquid phase 42 comprising dioxane and water is withdrawn from phase separator 40 through line 48 and passed into line 23 as a portion of the recycle vapor entrainer supplied to azeotroping column 11. In some instances wherein only a small excess of said vapor entrainer (dioxane and water) is added to azeotroping column 11 the bottoms product withdrawn through line 37 may not contain sufficient dioxane and water to make the use of phase separator 40 practical. In such instances the bottoms product can be passed through line 39 into line 43 and introduced into extraction zone 44 for extraction as previously described. The latter is my preferred method of operation.

The hydrocarbon products removed through lines 27, 38 or 46 can be freed from water by any conventional means such as by distillation or by contacting with an absorbent material such as bauxite.

The following example further illustrates the invention:

EXAMPLE

A blend of 97% cyclohexane and 3% 2,4-dimethylpentane was prepared and a portion of this blend was subjected to simple fractional distillation. A second portion was subjected to an azeotropic distillation in the presence of p-dioxane as the azeotrope former and a third portion was subjected to an azeotropic distillation in the presence of p-dioxane and water as the azeotrope former. Other portions were distilled at reduced pressure as shown in the following table. All of the distillations were carried out employing a 13 mm. I. D. Hypercal column equivalent to approximately 30 theoretical plates and using a reflux ratio of 50 to 1. The results of these distillations are summarized in Table I.

**Table 1.—Azeotropic distillation of 97 percent cyclohexane\* blend with 1,4-dioxane and water**

| Run No. | Entrainer | Charge to Still, Parts | | | Distillate, Vol. Percent (A+B) @ T. ° C. | Kettle Product | |
|---|---|---|---|---|---|---|---|
| | | Blend | A | B | | Vol. Percent of Blend | Purity\*, Vol. Percent C₆H₁₂ |
| 1 | A—1,4-Dioxane<br>B—Water | 50 | 10 | 10 | 50 | ᵃ 68.5 | 80 | 98.5 |
| 2 | No Entrainer | 50 | 0 | 0 | 0 | ᵃ 80.1 | 80 | 97.7 |
| 3 | A—1,4-Dioxane | 50 | 10 | 0 | 15.7 | ᵃ 79.3 | 73 | 98.5 |
| 4 | A—1,4-Dioxane<br>B—Water | 50 | 10 | 10 | 33 | ᵇ 36–39 | 80 | 98.5 |
| 5 | No Entrainer | 50 | 0 | 0 | 0 | ᶜ 26 | 80 | 97.5 |

\*Based on refractive index.
ᵃAtmospheric pressure, corrected to 760 mm.
ᵇAt 200 mm. total pressure.
ᶜAt 100 mm. total pressure.

It is evident that with straight fractionation alone it was not possible to produce cyclohexane having a purity of 98.5 percent at equivalent yield of kettle product. In run No. 3 with p-dioxane alone as an entrainer, it was possible to produce a 73 percent yield of cyclohexane having a purity of 98.5 percent. However, a comparison of runs 1 and 3 shows that with p-dioxane and water as an entrainer, it was possible to improve the yield of 98.5 percent purity cyclohexane appreciably, i. e., from 73 percent to 80 percent. Thus it is obvious that water has a beneficial effect upon the volatility characteristics and thus permits improved yields of high purity cyclohexane when used with p-dioxane as the azeotrope former. Run No. 2 shows that with no entrainer the purity of the cyclohexane was only 97.7 percent. Runs 4 and 5 show that the entrainer of the invention is effective at reduced pressures as well as at atmospheric pressures.

As mentioned above cyclohexane occurs naturally in small amounts in such hydrocarbon mixtures as natural and straight run gasolines. My invention can be employed for the recovery of cyclohexane from such mixtures. In such instances a cyclohexane concentrate is prepared by conventional distillation methods; a typical example being one prepared from a Borger, Texas natural gasoline and having the following composition.

| Component | Volume, Percent | Boiling Point, ° F. |
|---|---|---|
| n-Hexane | 0.8 | 155.7. |
| Methylcyclopentane | 6.6 | 161.3. |
| 2,2- and 2,4-Dimethylpentane | 8.6 | 174.6, 176.9, resp. |
| Cyclohexane | 72.9 | 177.3. |
| 3,3- and 2,3-Dimethylpentane | 6.6 | 186.9, 193.6, resp. |
| 1,1-Dimethylcyclopentanes | 4.5 | 190.1. |

The cyclohexane concentrate is first separated by conventional distillation methods into a narrow boiling range fraction of gasoline by removing the 3,3- and 2,3-dimethylpentane and dimethylcyclopentane components as a bottoms product. The overhead product, comprising the remainder of the components listed in the above table, is then charged to azeotroping column 11 and treated as previously described.

The choice of the heterocyclic organic compound to be used will depend upon the average boiling point of the hydrocarbon fraction to be separated. The boiling point of the heterocyclic organic compound should not be more than about 30° C. above or 30° C. below and preferably not more than about 20° C. above or 20° C. below, the average boiling point of the fraction to be separated.

The minimum ratio of azeotrope former to the naphthenic-paraffinic hydrocarbon fraction which is suitable for carrying out my invention will vary with the amount and nature of the paraffinic hydrocarbon impurities in the hydrocarbon fraction, the purity desired for the naphthenic residue from the distillation, the proportion of naphthenes in the original hydrocarbon fraction which is to be recovered as residue from the distillation, and the procedure used for the azeotropic distillation. The proportion of the azeotrope former to be used can be readily adjusted to any ideal point, depending on whether it is desired that the naphthenic hydrocarbon content remain as bottoms product from the distillation in practically pure state, i. e., free from paraffinic hydrocarbon, or whether it is desired to distill only a portion of the paraffinic hydrocarbons leaving a portion thereof as bottoms together with the naphthenic hydrocarbon. Also, the distillation temperature and amount of azeotrope former can be adjusted to effect the distillation of all of the paraffinic hydrocarbons together with a portion of the naphthenic hydrocarbons.

The process of the present invention can be practiced as a batch process or as a continuous process. In either type of operation, the p-dioxane-water layer of the azeotrope fraction is advantageously recycled to the distillation column. In this way the p-dioxane requirement is considerably reduced.

While the process of my invention can be used for separating components of a narrow boiling range hydrocarbon fraction it can also be used for merely separating difficultly separable hydrocarbons. For example, two hydrocarbons may differ from each other quite appreciably in boiling points and yet their separation by fractional distillation of a mixture of the two will be substantially impossible. Such a case can occur when the two hydrocarbons form an azeotrope. When this condition occurs both of the hydrocarbons irrespective of their individual boiling points will distill overhead as a constant boiling mixture of constant composition dependent upon the pressure maintained in the still. Thus by the term difficultly separable hydrocarbons as used throughout this specification and claims is meant two or more hydrocarbons which are difficult to separate by distillation means because of the formation of an azeotrope or because boiling points are very close together. By the term narrow boiling range hydrocarbon fraction is meant a fraction of hydrocarbons, the components of which have boiling points so near one another that it is practically impossible to effect a separation by conventional distillation methods. By narrow boiling range fraction of gasoline as used herein in the specification and in the claims is meant, such a fraction of gasoline as may boil within a range of about 8 to 15° F. or less.

Equipment for carrying out the process of my invention can be selected from that commercially available, taking into account any corrosive nature of any of the materials being processed. Such auxiliary apparatus as valves, pumps, meters, temperature and pressure recording and controlling devices, flow meters and controllers are not shown on the drawing or described in the specification for purposes of simplicity. The need of such auxiliary apparatus, its installation and use are well understood by those skilled in the art.

While certain embodiments of the invention have been described for illustrative purposes, the invention obviously is not limited thereto.

I claim:

1. A process for the separation of naphthenic hydrocarbons from a mixture of hydrocarbons containing substantially only naphthenic, paraffinic and isoparaffinic hydrocarbons, which comprises: subjecting said mixture to azeotropic distillation conditions in the presence of a vapor entrainer consisting essentially of water and a saturated oxygen containing heterocyclic organic compound having from five to six members in the ring, three to four of said members being carbon atoms, and two to three of said members being oxygen atoms; and recovering naphthenic hydrocarbons from said distillation.

2. The process of claim 1 wherein said saturated heterocyclic organic compound is 1,4-dioxane.

3. The process of claim 1 wherein said saturated heterocyclic organic compound is dioxolane.

4. The process of claim 1 wherein said saturated heterocyclic organic compound is 1,3-dioxane.

5. The process of claim 1 wherein said saturated heterocyclic organic compound is trioxane.

6. A method for separating 2,2- and 2,4-dimethylpentane and cyclohexane from a narrow boiling range mixture of hydrocarbons containing essentially at least one of said dimethylpentanes and cyclohexane which comprises: subjecting said mixture to azeotropic distillation conditions in the presence of a vapor entrainer consisting essentially of water and a saturated oxygen containing heterocyclic organic compound having from five to six members in the ring, three to four of said members being carbon atoms, and two to three of said members being oxygen atoms; recovering cyclohexane from the kettle product and recovering said dimethylpentanes from the overhead distillate.

7. A method according to claim 6 wherein said saturated heterocyclic organic compound is 1,4-dioxane.

8. A method according to claim 6 wherein said saturated heterocyclic organic compound is dioxolane.

9. A method according to claim 6 wherein said saturated heterocyclic organic compound is 1,3-dioxane.

10. A method according to claim 6 wherein said saturated heterocyclic organic compound is trioxane.

11. A method according to claim 6 wherein just sufficient of said saturated heterocyclic organic compound and water are used to produce an azeotrope with the dimethylpentane content of said hydrocarbon mixture.

12. A method according to claim 6 wherein an excess of said saturated heterocyclic organic compound and water over that required to azeotrope with the dimethylpentane content of said hydrocarbon mixture is used.

13. A method for separating 2,2- and 2,4-dimethylpentanes, and cyclohexane from a narrow boiling range mixture of hydrocarbons containing essentially at least one of said dimethylpentanes and said cyclohexane, which comprises: subjecting said mixture to azeotropic distillation conditions in the presence of water and 1,4-dioxane as an entrainer and thereby producing a first overhead vaporous product and a liquid bottoms product; withdrawing said liquid bottoms product comprising said cyclohexane as one product of the process; condensing said overhead vaporous product to form a condensate; separating from said condensate a first liquid phase comprising said dimethylpentane containing dissolved 1,4-dioxane and water, and a second liquid phase comprising 1,4-dioxane and water containing dissolved dimethylpentane; returning said second liquid phase to said distillation as at least a portion of said entrainer; extracting said first liquid phase with water to form a raffinate phase and an extract phase; recovering said raffinate phase comprising said dimethylpentane as a second product of the process; distilling said extract phase to produce water as bottoms product and an overhead product comprising an azeotropic mixture of 1,4-dioxane and water; and combining said last mentioned overhead product with said mixture of hydrocarbons.

14. A method for separating 2,2- and 2,4-dimethylpentanes, and cyclohexane from a narrow boiling range mixture of hydrocarbons containing essentially at least one of said dimethylpentanes and said cyclohexane, which comprises: subjecting said mixture to azeotropic distillation conditions in the presence of water and 1,4-dioxane as an entrainer and thereby producing a first vaporous overhead product and a liquid bottoms product; condensing said overhead product to form a condensate; separating from said condensate a first liquid phase comprising said dimethylpentane containing dissolved 1,4-dioxane and water, and a second liquid phase comprising 1,4-dioxane and water containing dissolved dimethylpentane; returning said second liquid phase to said distillation as at least a portion of said entrainer; extracting said first liquid phase with water to form a first raffinate phase and a first extract phase; recovering said first raffinate phase comprising said dimethylpentane as a product of the process; extracting said liquid bottoms product with water to form a second raffinate phase and a second extract phase; recovering said second raffinate phase comprising said cyclohexane as a second product of the process; combining said first extract phase with said second extract; distilling said combined extract phases to produce water as a bottoms product and an overhead product comprising an azeotropic mixture of 1,4-dioxane and water; and combining said last mentioned overhead product with said mixture of hydrocarbons.

References Cited in the file of this patent

UNITED STATES PATENTS

| 2,368,050 | Tooke | Jan. 23, 1945 |
| 2,397,839 | Clark | Apr. 2, 1946 |
| 2,555,650 | Lake | June 5, 1951 |
| 2,609,333 | Boyd | Sept. 2, 1952 |
| 2,690,992 | McCants | Oct. 5, 1954 |

FOREIGN PATENTS

| 608,606 | Great Britain | Sept. 17, 1948 |
| 136,038 | Australia | Jan. 25, 1950 |